Figure 1:
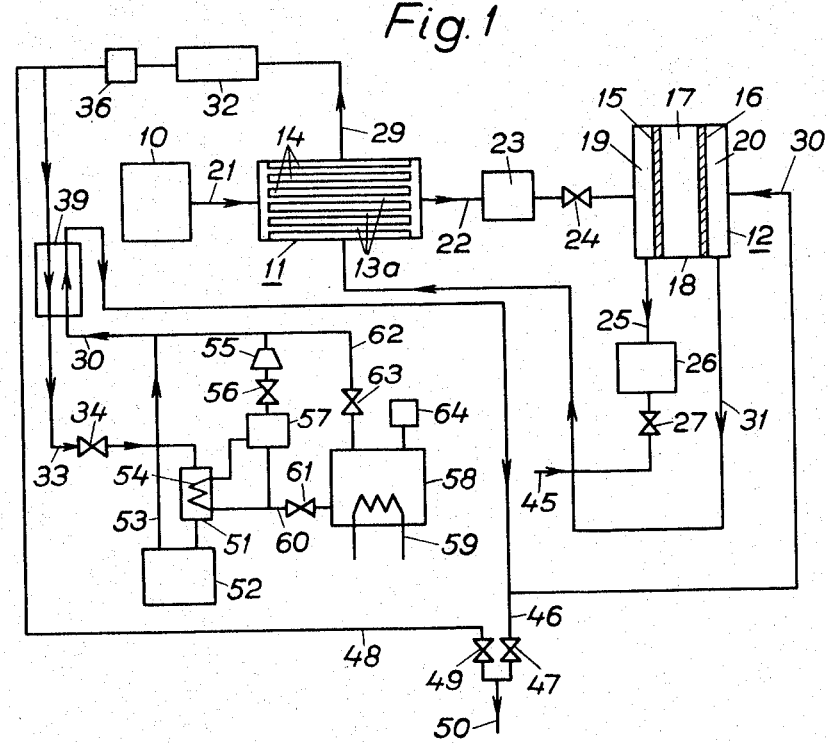

Jan. 31, 1967     O. LINDSTRÖM     3,301,709

METHOD AND MEANS FOR MANUFACTURING LIQUID OXYGEN FOR FUEL CELLS

Filed June 12, 1964

INVENTOR.
OLLE LINDSTRÖM

BY Bailey, Stephens &
Huettig

¹
3,301,709
METHOD AND MEANS FOR MANUFACTURING LIQUID OXYGEN FOR FUEL CELLS
Olle Lindström, Vasteras, Sweden, assignor to Allmanna Svenska Elektriska Aktiebolaget, Vasteras, Sweden, a corporation of Sweden
Filed June 12, 1964, Ser. No. 374,669
Claims priority, application Sweden, June 17, 1963, 6,647/63
2 Claims. (Cl. 136—86)

In fuel cell machinery in submarines in which fuels containing nitrogen are combusted with formation of free nitrogen, which is at least partly condensed in condensers and collected in storage tanks, a storage of liquid nitrogen is formed on board. The vapourization of the nitrogen, necessary in itself, is utilized according to the present invention for production of oxygen required for the operation of the fuel cell machinery.

The present invention thus concerns a method of producing oxygen for fuel cell systems in submarines, in which a fuel containing nitrogen is combusted with formation of free nitrogen gas, which is at least partly condensed in a condenser, which is characterized in that the condensed nitrogen is used to produce liquid oxygen for use as coolant in the condenser and in gas form as oxidant in the fuel cell by using the condensed nitrogen while vapourizing as coolant for condensing oxygen from air. By liquid oxygen is meant, both in the specification and in the claims, not only pure oxygen but also oxygen containing considerable amounts of nitrogen.

The fuel containing nitrogen, e.g. ammonia, may in accordance with the application S.N. 278,732, filed May 7, 1963, be used in such a way that it is cracked with formation of hydrogen and nitrogen in a cracker connected to the fuel cell. The cracker may then comprise a reaction chamber for cracking the substance containing nitrogen and a combustion chamber for heating the reaction chamber. Hydrogen and nitrogen formed in the reaction chamber may be led to a hydrogen chamber in the fuel cell, where the hydrogen is partly consumed for the operation of the fuel cell and hydrogen not consumed in the fuel cell is led together with the nitrogen to the combustion chamber of the cracker and is there utilized as fuel. The oxygen produced may also be used for the combustion of the hydrogen in the combustion chamber of the cracker whereby it can be led in gas form to the combustion chamber of the cracker either directly from the container where it is condensed or when it has, while being partly used, passed the oxygen chamber of the fuel cell.

The otherwise useless store of condensed nitrogen which is produced on board submarines is, according to the invention, as is mentioned before, given an important function. Since the condensed nitrogen is utilized for the manufacture of liquid oxygen, the submarine need not search for bases supplied with liquid oxygen but can produce it itself.

An advantageous arrangement for carrying out the method according to the invention comprises a distillation column and a heat exchanger for cooling the air led to the column with vapourized nitrogen departing from the column.

The invention will be explained in more detail by describing an embodiment, chosen as example, with reference to the accompanying drawing, in which FIGURE 1 shows schematically a fuel cell machinery, where a fuel containing nitrogen is combusted with formation of free nitrogen, which is condensed in a condenser, and FIGURE 2 an arrangement for performance of the method according to the present invention, the arrangement comprising essentially a distillation column and heat exchangers.

In the arrangement according to FIGURE 1, 10 designates a tank containing liquid ammonia, 11 an ammonia cracker and 12 a fuel cell. The ammonia cracker comprises a reaction chamber, e.g. consisting of several tubes or retorts 13a containing a suitable cracking catalyst with for example iron oxide, nickel or platinum as active component and a combustion chamber 14 surrounding the tubes 13a. The fuel cell contains two porous electrodes 15 and 16. Between the electrodes is the electrolyte 17 in the electrolyte chamber 18. Outside the electrode 15 is a gas chamber 19 for the fuel and outside the electrode 16 a gas chamber 20 for the oxidising substance. The electrode 15 may for example consist of an active nickel electrode produced in a known way be pressing and sintering a powder mixture of aluminum nickel alloy and carbonyl nickel, after which the sintered product is activated by removing of the aluminum with alkali. The electrode 16 may for example consist of a silver electrode produced in analogous and likewise known way of a powder mixture of silver-aluminum alloy and carbonyl nickel. The electrolyte 17 may consist of for example potassium hydroxide solution. The operating temperature may be about 80° C. When the arrangement is in operation the ammonia is conveyed from the tank 10 through the conduit 21 to the cracker 11 where two volumes of ammonia are cracked with formation of one volume of nitrogen and three volumes of hydrogen. The mixture of nitrogen gas and hydrogen gas is led through the conduit 22, which may contain a smaller buffer tank 23 and a control valve 24 to the gas chamber 19 of the fuel cell where a greater part, preferably about two-thirds of the hydrogen, is consumed by oxidation during the electrode reaction which takes place. The remaining hydrogen gas together with the unchanged nitrogen gas passes through the conduit 25, which may contain a smaller buffer tank 26 and a control valve 27, to the combustion chamber 14 of the cracker 11, where it is burned up by air or oxygen gas, which may be supplied through the conduit 31, before the gases reach the cracker. The combustion chamber may also lie outside the actual cracker, from which the warm combustion gases are led into the actual cracker in order to heat the gas in the reaction chamber. The combustion gases, which consist of water vapour, nitrogen gas and possibly excess oxygen gas are led away through the conduit 29 to a condenser 32 for removal of water vapour content in the exhaust. Before the exhaust is transported by the conduit 33 with the valve 34 to an arrangement for condensation, it passes a drying device 36, e.g. with molecule filters or silica gel for removal of remaining traces of water vapour and other absorbable material. The exhaust coming through the conduit 33 is led through condenser 51 where at least a part of the nitrogen gas is condensed and collected in the container 52. Uncondensed exhaust is led through the conduit 53 to the conduit 30. The condensation of the nitrogen gas is effected by liquid oxygen, which is kept at a lower pressure than the exhaust so that its boiling point is below the boiling point for the nitrogen, being led through a cooling coil 54 in the condenser. The lower pressure in the cooling coil is maintained by means of the pump 55 and is regulated with the valve 56. Vapourised oxygen gas is separated from liquid oxygen in the separating vessel 57. The liquid oxygen is supplied to the cooling coil 54 from the oxygen tank 58 provided with the heating coil 59, through the conduit 60 containing the valve 61. The valve 61 is controlled by the liquid level in the separating vessel 57, so that complete evaporation of the liquid in the separating vessel 57 is prevented. The conduit 30 may also be supplied with oxygen gas direct from the tank 58 through the conduit 62 containing the valve 63. In order to maintain the nitrogen gas balance in the system, so that the amount of nitrogen gas which remains in the container 52 is as large as the amount of new nitrogen produced simultaneously in the cracker 11, the temperature of the oxygen in the cooling coil 54 and thereby the cooling effect is regulated by adjusting the pressure in the separating vessel 57 with the valve 56. Adjustment of the amount of oxygen gas in the conduit 30 is produced by evaporation of oxygen from the tank 58 with the heating coil 59. At very low power output from the fuel cell battery heat leakage into the system may be so high that the amount of oxygen gas which escapes in the conduit 30 exceeds that consumed by the fuel cell and the ammonia cracker, whereby the oxygen pressure should increase in the system. This may be prevented by using a liquefier 64.

The gas enriched with oxygen passes conduit 30, after having been heated in a heat exchanger which simultaneously is used for cooling of the nitrogen gas led to the container 52 to the oxygen chamber 20 of the fuel cell, where the oxygen is partly consumed. Unconsumed oxygen gas is led through the conduit 31 to the combustion chamber 14 of the ammonia cracker where it acts as oxidising agent for the hydrogen gas from the hydrogen chamber 19 of the fuel cell. For renewal of the atmosphere in the submarine used air may be taken in via 45. Oxygen-rich gas may then be taken out through the conduit 46 through the valve 47 and mixed with oxygen-poor gas from the conduit 48 with the valve 49. The mixture is led out into the submarine through the conduit 50 so that pressure and composition of the atmosphere in the submarine is kept constant. The impurities in the used air are burned up in the ammonia cracker. The utilization of the liquid nitrogen collected in the tank 52 for production of liquid oxygen for the requirements of the submarine may occur in a way which is illustrated in FIGURE 2.

The column 101 is fed with liquid nitrogen from the container 52 through the conduit 103 and with air through the conduit 104. The air taken in is freed from water vapour and other impurities which might precipitate in the system, and is cooled in a dryer 105 consisting of a heat exchanger, after which it is further cooled in the heat exchanger 106. In the column 101 nitrogen is driven off and oxygen in the air is condensed. The liquid oxygen thus formed is collected in the container 58 through the conduit 108. The nitrogen driven off is led away by the conduit 109 and utilized as coolant for the air coming into the heat exchangers 105 and 106 before it leaves the apparatus. A high rate of separation can be achieved in the column if it has a large number of bottoms 110.

The system may suitably have additionally a liquefier 111 connected in the circuit 112 to increase the condensing capacity so that a full oxygen store can be produced on every occasion. With the ammonia process according to the net reaction formula $2H_3N + 3/2O_2 = N_2 + 3H_2O$ a smaller amount of nitrogen is produced than the amount of oxygen which is consumed.

Figure 2:
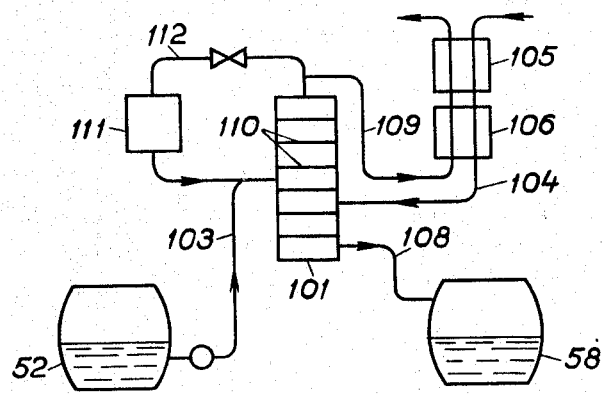

It is suitable to arrange valves in the conduits 103 and 108, so that the column 110, the heat exchangers 105 and 106 and other arrangements connected to the column according to FIGURE 2 can be permanently coupled to the system shown in FIGURE 1 and brought into operation when required in an easy way.

I claim:
1. In a method of producing oxygen for fuel cell systems in submarines, in which a fuel containing nitrogen is combusted with formation of nitrogen gas, which nitrogen gas is at least partly condensed to liquid state in a condenser, the steps comprising bringing the liquid nitrogen into heat exchange relation with air to condense at least some of the oxygen of the air to a liquid while the liquid nitrogen is vaporized, reducing the pressure on said liquid oxygen to a sufficient extent to reduce the temperature thereof below the boiling point of nitrogen, and bringing at least a part of the condensed liquid oxygen at such reduced temperature into heat exchange relation with the nitrogen gas to condense at least some of the nitrogen gas to a liquid.

2. In a method as claimed in claim 1, vaporizing at least a part of the condensed oxygen and supplying the vaporized oxygen to the fuel cell as an oxidant therein.

References Cited by the Examiner
UNITED STATES PATENTS

| | | | |
|---|---|---|---|
| 2,013,809 | 9/1935 | Salisbury | 23—220 |
| 2,384,463 | 9/1945 | Gunn et al. | 136—86 |
| 2,423,273 | 7/1947 | Van Nuys | 62—40 X |

WINSTON A. DOUGLAS, *Primary Examiner.*

JAMES H. TAYMAN, JR., *Examiner.*

H. FEELEY, *Assistant Examiner.*